No. 628,468. Patented July 11, 1899.
B. F. HUDSON.
SAND SCREEN FOR WATER WELLS.
(Application filed Dec. 10, 1898.)
(No Model.)

Witnesses
C. H. McEwen
S. E. Zimmerman

Inventor
Benjamin F. Hudson
By W. W. Dudley & Co.
his Attorneys

UNITED STATES PATENT OFFICE.

BENJAMIN F. HUDSON, OF ROCKPORT, TEXAS.

SAND-SCREEN FOR WATER-WELLS.

SPECIFICATION forming part of Letters Patent No. 628,468, dated July 11, 1899.

Application filed December 10, 1898. Serial No. 698,887. (No model.)

*To all whom it may concern:*

Be it known that I, BENJAMIN F. HUDSON, a citizen of the United States, residing at Rockport, in the county of Aransas and State of Texas, have invented certain new and useful Improvements in Sand-Screens for Water-Wells; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to water-wells, and is directed to improvements in sand-screens for use in connection therewith, the object of the invention being the production of a screen which is practically sand-proof and which is self-cleaning.

My improved sand-screen, while capable of employment in localities generally, is adapted more especially for use in places where an abundant supply of water is obtainable only under great difficulties—as, for instance, in shifting beds or bodies of quicksand. One difficulty which is experienced in obtaining water from such localities is the tendency of the screen to become clogged, owing to the passage of the fine sand particles through the interstices of the screen jacket or fabric, which particles in a comparatively short time accumulate to such an extent as to clog the entire jacket, rendering it necessary to remove the screen to permit of its being cleaned. In connection with my improved screen I employ a fabric of very fine mesh, which renders it practically sand-proof; but despite every precaution the finer particles of sand find their way through the interstices, and unless some means is provided to insure their expulsion the difficulty above noted will ever be present. One feature of my invention consists in the provision of means by which this difficulty is completely overcome, the means employed operating to cause agitation of the sand particles at the bottom of the screen and to keep them in suspension in the water, whereby they are carried with the water upwardly through the suction-pipe at each ascent of the piston, and are thereby prevented from accumulating in any such quantity as will result in the water-supply becoming impaired.

My invention consists of other novel details of construction and operation, which, with the feature above noted, are fully set forth in the following description.

Figure 1:
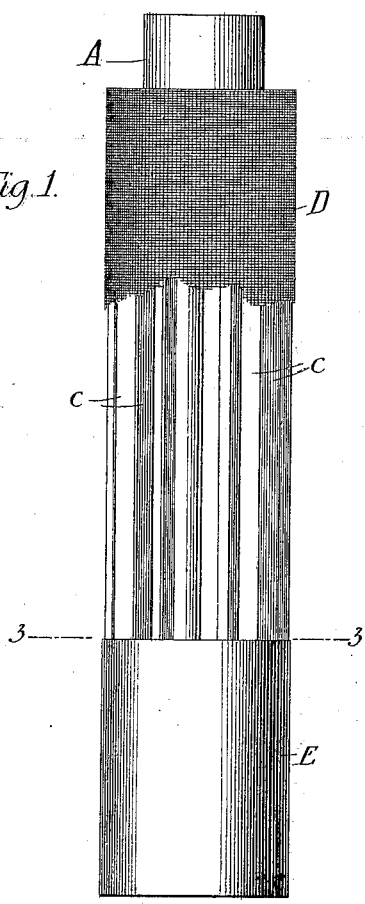
Figure 2:
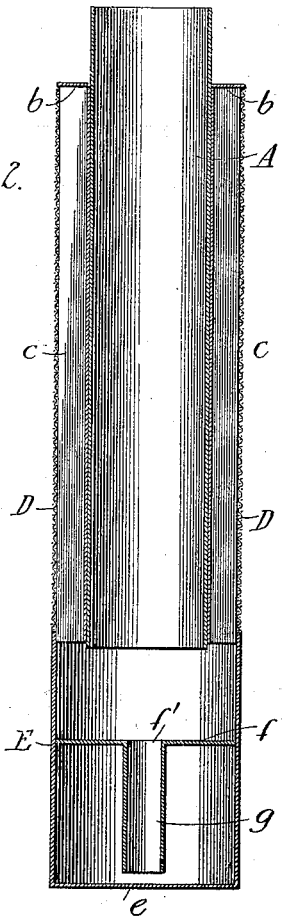
Figure 3:
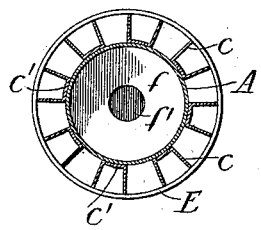
Figure 4:
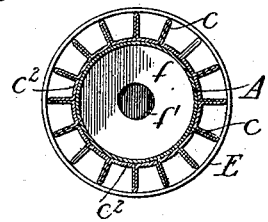

In the drawings referred to in the description, Figure 1 is an elevation, partly in section, of my improved sand-screen. Fig. 2 is a vertical central sectional view. Fig. 3 is a transverse sectional view taken in line 3 3 of Fig. 1; and Fig. 4 is a transverse sectional view taken in line 3 3 of Fig. 1, but showing a modification.

Referring to the said drawings by letter, A denotes the suction-pipe, which has pipe connection with the pump. (Not shown.) Near the upper end of the pipe A is secured an exterior flange $b$, and longitudinally-extending ribs $c\ c$ are secured exteriorly on said pipe between the flange $b$ and lower end. These ribs project radially from the outer side of the pipe and are formed by a plurality of U-shaped sheet-metal strips $c'\ c'$, which are secured equidistant from each other around the pipe, as shown in Fig. 3, or which are formed by fluting a single sheet of metal $c^2$, as shown in Fig. 4. The screen-jacket D, which is preferably woven-wire fabric of fine mesh, surrounds the suction-pipe, but is prevented from contacting therewith by the interposed ribs $c$. The jacket is secured at its upper end to the flange $b$ and at its lower end to a cylindrical casing E, said casing being secured to the lower outer edges of the ribs. The casing E is closed at its lower end by a bottom plate $e$, and at $f$ in said casing is a horizontal partition having a central opening $f'$, around which is secured a tube $g$, said tube terminating a short distance above the bottom plate $e$. An air-chamber H is thus formed below the partition $f$, which chamber is closed at its top by said partition and at its bottom when immersed by the water-seal formed by the depending tube $g$ and the body of water which enters and occupies the bottom of the chamber. With the screen in position and a proper quantity of water in the chamber the air is prevented from escaping, and it is the action of this body of air, aided by the operation of the pump, which effects the agitation of the fine sand particles and their expulsion with the water at each ascent of the piston.

The screen is practically buried in the sand-body, and thus forms a well in itself. The jacket acts more or less efficiently to prevent the entrance of sand into the screen; but, as before stated, some of the sand particles are of such a degree of fineness that their exclusion is impossible, and such particles, with the water, are drawn in through the interstices of the fabric at each upward movement of the piston and are carried between the ribs downwardly in the direction of the lower end of the suction-pipe. Were no means provided for their removal these particles would by reason of their specific gravity settle in the bottom of the screen and would shortly accumulate to such an extent as to choke the suction-pipe. By the employment of the air-chamber, however, these particles are kept in suspension and are prevented from settling, as at each downward movement of the piston the air in the chamber is put under compression by the water entering through the tube $g$, such compression being sufficient to cause a return pressure on the water in the upward movement of the piston, the result being that the water and the particles are subject alternately to pressure from above and below and that said particles are in constant agitation and are prevented from settling and accumulating. In the downward movement of the piston, therefore, the air is put under compression, and when the piston starts upward compression is relieved, when the reacting force of the compressed air drives the sand particles, together with the excess of water, centrally and directly upward through the suction-pipe and out through the pump. The screen is thus cleansed of all matter which in any way would impair the operation if allowed to remain. The compression of the air in the air-chamber is obtained by the entrance thereto of water coming in through the screen-jacket, and also by the weight of the column of water in the suction-pipe while the plunger is descending. Thus at each descent of the piston there is stored sufficient air-pressure to expel from the air-chamber the excess of water and sand particles which were forced into it. In this way a column of water is constantly under movement due to the alternate hydraulic and pneumatic pressures brought to bear upon it, and it is this movement of the water-column which causes the agitation of the particles and their expulsion while in suspension at each ascent of the pump piston or plunger.

My improved screen is thus very efficient, especially in the localities above noted, where great difficulty is experienced in obtaining a good water-supply even if water exists in great quantity. The screen is, moreover, very simply and cheaply constructed, is durable, and may be made of materials which are not affected by the action of water.

I claim as my invention—

1. A sand-screen comprising a suction-pipe open at or near its lower end, a screen-jacket surrounding said pipe but out of contact therewith, and a casing below the suction-pipe having an air-chamber communicating at its lower end with the interior of the screen, substantially as described.

2. A sand-screen comprising a suction-pipe open at or near its lower end, a screen-jacket surrounding said pipe but separated from contact therewith by longitudinally-disposed ribs, a casing below the suction-pipe closed at its lower end, and provided with a horizontal partition forming the top of an air-chamber, said partition having an opening, and a tube secured around said opening and entering the chamber to a point near its lower end, substantially as described.

In testimony whereof I affix my signature in presence of two witnesses.

BENJAMIN F. HUDSON.

Witnesses:
JOHN C. SORENSON,
PAUL B. SORENSON.